United States Patent [19]

Voornas

[11] Patent Number: 4,724,880
[45] Date of Patent: Feb. 16, 1988

[54] APPARATUS FOR MAINTAINING A SPARE TIRE FULLY INFLATED

[76] Inventor: Nicholas M. Voornas, 5 John Dr., Hawthorn Woods, Ill. 60047

[21] Appl. No.: 920,151

[22] Filed: Oct. 17, 1986

[51] Int. Cl.⁴ .............................................. B60C 29/02
[52] U.S. Cl. .................... 152/427; 73/146.8; 116/34 R; 137/227; 141/379; 224/42.24; 224/311
[58] Field of Search .............. 152/415, 427, 429, 428; 7/100; 141/38, 379; 116/34 R; 73/146.2, 146.8; 137/227, 228, 229; 224/42.24, 42.26, 311; 296/37.3; 410/47, 77, 90, 91

[56] References Cited

U.S. PATENT DOCUMENTS

| | | | |
|---|---|---|---|
| 2,663,348 | 12/1953 | Farris | 152/415 |
| 2,679,654 | 6/1954 | Hosking | 7/100 X |
| 2,813,567 | 11/1957 | Williams | 152/415 |
| 3,019,831 | 2/1962 | Morrello | 152/415 |
| 3,823,858 | 7/1974 | Schnakenberg | 224/42.24 |
| 4,051,803 | 10/1977 | Arnone | 73/146.5 X |
| 4,256,160 | 3/1981 | More | 137/223 X |

OTHER PUBLICATIONS

Letter from Brian Parduhn, Vice President, Marketing, G. H. Meiser & Co., 2407 West 140th Place, P.O. Box 315, Posen, IL 90469.
AccuGage Precision Tire Gauges and Tire Pumps Catalog 1212, G. H. Meiser & Co., p. 2.
Article entitled "Easy-Reading Guide, Home Mechanix, May, 1987, p. 76.

Primary Examiner—Donald E. Czaja
Assistant Examiner—Thomas Bokan
Attorney, Agent, or Firm—Henderson & Strum

[57] ABSTRACT

An apparatus for maintaining a spare tire in the trunk of a vehicle fully inflated. A conventional spare tire has a metal wheel with a rubber inflatable tire attached thereto and a valve stem extending out of the bottom on one side thereof. An extension tube sealingly attached at one end thereof to one end of the valve stem on one side of the wheel extends to the other side of the wheel through a rubber washer disposed in one of the lug holes. A one-way valve stem is disposed in the other end of the extension tube for permitting inflation of the tire through the extension tube. A pressure gauge is connected to the extension tube adjacent to the one-way valve for constantly showing the air pressure inside of the tire.

3 Claims, 3 Drawing Figures

U.S. Patent Feb. 16, 1988 4,724,880

APPARATUS FOR MAINTAINING A SPARE TIRE FULLY INFLATED

TECHNICAL FIELD

The present invention relates generally to an inflation and maintenance apparatus for spare tires, and more particularly to such an apparatus which constantly shows the inflation pressure of the spare tire and permits ready access for inflation of such spare tire without moving the spare tire from a vehicle trunk.

BACKGROUND ART

Spare tires on motor vehicles are rarely thought of by the vehicle user until such time that they are needed. When that happens, the vehicle user often finds out that the spare tire is flat or at least severely under inflated. Consequently, in order to be sure that a spare tire is fully inflated, the vehicle user must check the pressure therein from time to time, and this quite often requires removal of the tire from the trunk or moving it around in the trunk, either of which requires considerable effort. This problem is only exacerbated if the tire is secured to the trunk or if the trunk contains other things which must also be moved or removed during the process.

U.S. Pat. No. 3,019,831 to Morrello attempts to solve the aforementioned problem by attaching a pressure hose to the valve stem on the spare tire inside of a trunk and has a pressure hose leading to a valve stem which extends to the outside of the vehicle body and is attached to the vehicle body so that the pressure can be checked at the same time the other tires on the vehicle are checked. It also permits inflation without opening the trunk of the car. While this approach to solving the problem is good in certain respects, it does require alteration to the body of the vehicle and also presents an unsightly valve stem sticking out of the side of the vehicle body. This valve stem extension can catch car wash brushes and can involve considerable expense in drilling through the body of a car and putting it into place.

Consequently, there is a need for an apparatus for maintaining proper inflation of a spare tire without requiring modification to the body of a vehicle.

DISCLOSURE OF THE INVENTION

The present invention relates to an apparatus for maintaining a spare tire in the trunk of a vehicle fully inflated. A conventional spare tire has a metal wheel with a rubber inflatable tire attached thereto and a valve stem extending out of the bottom on one side thereof. The present invention utilizes an extension tube sealingly attached at one end thereof to one end of the valve stem on one side of the wheel and extends to the other side of the wheel through a rubber washer disposed in one of the lug holes. A one-way valve stem is disposed in the other end of the extension tube for permitting inflation of the tire through the extension tube and a pressure gauge is connected to the extension tube adjacent to the one-way valve for constantly showing the air pressure inside of the tire.

An object of the present invention is to provide an improved apparatus for maintaining a spare tire in a fully inflated condition in the trunk of a vehicle.

Another object of the present invention is to provide an apparatus of the aforementioned type which does not require modification to the body of the vehicle.

A further object of the present invention is to provide an apparatus of the aforementioned type having a pressure gauge thereon for constantly showing the amount of pressure in the spare tire.

A still further object of the present invention is to provide an apparatus of the aforementioned type which has an extension tube leading to a valve stem which is underneath a spare tire as it is in the trunk of a car and leads to a one-way valve stem on the top of the spare tire so that the tire can be inflated without turning the tire over or removing it from the trunk of the car.

Other objects, advantages and novel features of the present invention will become apparent from the following detailed description of the invention when considered in conjunction with the accompanying drawings.

BEST MODE FOR CARRYING OUT THE INVENTION

Figure 1:
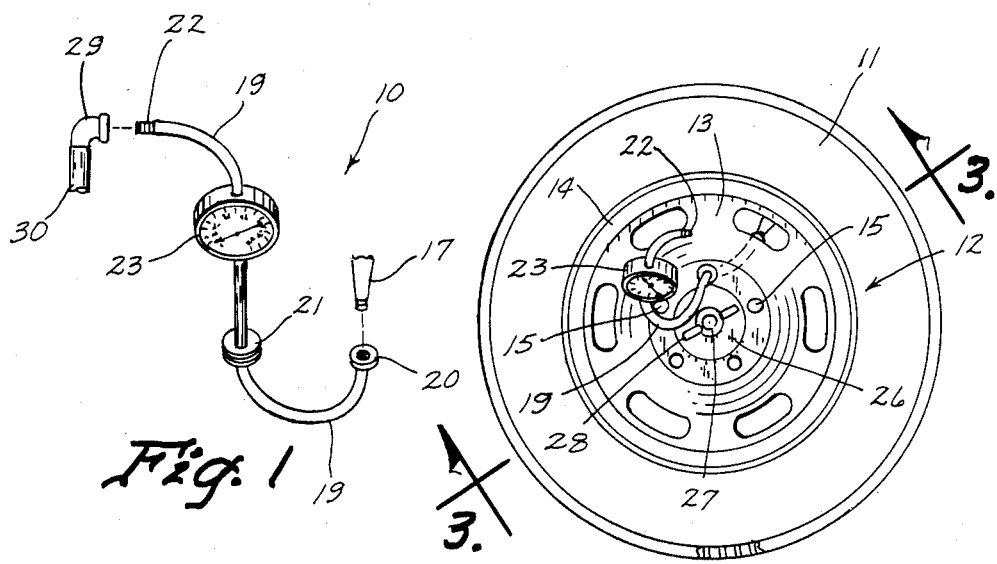
FIG. 1 is a perspective view of the present invention shown disconnected from the spare tire of a vehicle.

Referring now to the drawings, wherein like reference numerals designate identical or corresponding parts throughout the several views, FIG. 1 shows an apparatus (10) for attachment to the spare tire of a vehicle for maintaining the spare tire fully inflated at all times and for monitoring that such is the case.

Figure 2:
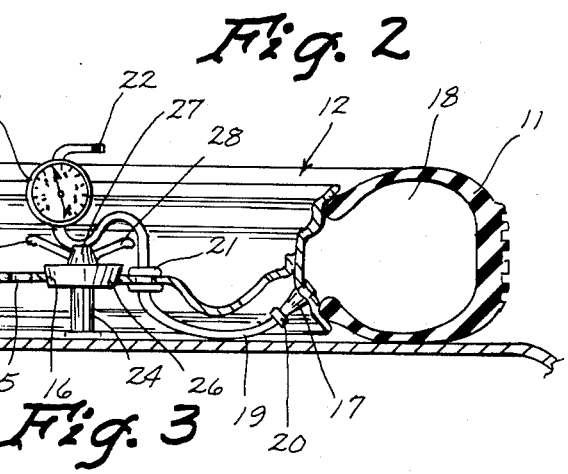
FIG. 2 is a top view of the spare tire connected in the trunk of a vehicle and having a preferred embodiment of the present invention attached thereto.

Referring to FIG. 2, it is noted a rubber tire (11) is shown mounted onto a metal wheel (12) of a type having a central metal portion (13) thereon rigidly attached to an outer peripheral metal portion (14). The central metal portion (13) has a plurality of lug holes (15) disposed therethrough and a central open hub (16). A stem (17) is hollow and extends from the interior opening (18) of the rubber tire (11), through a one-way valve disposed therein (which is optional and not shown). An extension tube (19) has a mechanism (20) on one end thereof for threading onto the valve stem (17) and at the same time for depressing the one-way valve disposed therein to hold it in a constantly open position. A rubber washer (21) extends through one of the openings (15) and permits the extension tube (19) to be slidably disposed therethrough for protecting it from damage. The other end of the extension tube (19) has a one-way valve structure (22) attached thereto which is identical in most respects to the threaded metal end of a valve stem of a conventional wheel and tire of a vehicle.

A pressure gauge (23) is attached to the extension tube (19) near the valve stem (22) thereof and is in a position so that it can be easily read by merely opening up the truck and looking at the spare tire.

A shaft (24) is secured to the bottom (25) of the trunk of the car and has a hub member (26) with a central opening therein which rests in the open hub (16) of the central metal portion (13) of the wheel (12). The top end of the member (24) has external threads thereon and member (27) having wings (28) thereon threadably engages the threads of the member (24) to tighten down the hub member (26) against the top of the central metal portion (13) to hold the spare tire securely in place in the trunk and prevent it from shifting around during the time that the vehicle is driven from place to place.

Figure 3:
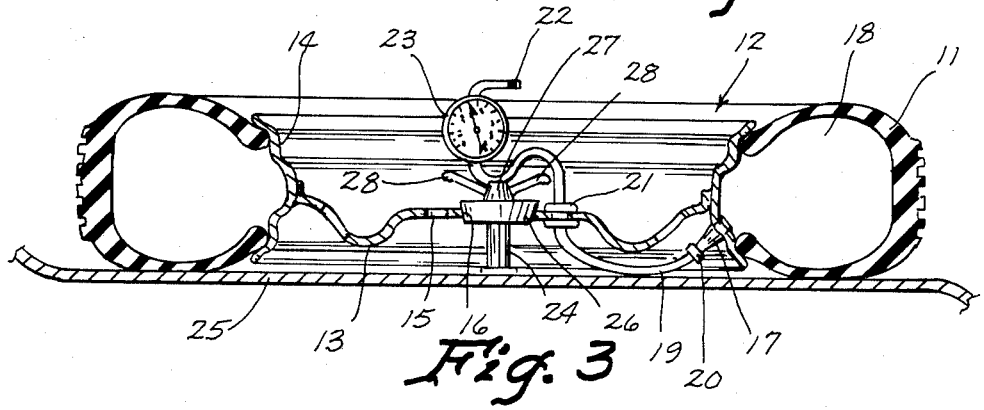
FIG. 3 is a cross sectional view taken along line 3—3 of FIG. 2.

To use the preferred embodiment (10) as shown in FIG. 3, a vehicle user would merely look at the gauge (23) from time to time when the trunk is opened and check to be sure that the pressure, normally measured in pounds per square inch (psi) is proper. If the user notices that the pressure is below the recommended level for the spare tire, then it can be inflated by using the standard nozzle (29) available at almost any service station. By placing the nozzle (29) securely and firmly against the valve stem (22), air will enter the extension tube (19), travel through the pressure gauge (23) and enter the inside (18) of the tire (11) through the valve stem (17). It is to be understood of course that the one-way valve within the valve stem (22) is held open when the nozzle (29) is pushed against it so that high pressure air connected to hose (30) can enter the tire (11).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. Apparatus for maintaining a spare tire fully inflated consisting of:
   a rubber annular inflatable tire;
   a metal wheel of a type having a central metal portion having a central open hub and an outer peripheral metal portion, a plurality of lug bolt holes disposed in said central metal portion around said open hub, said rubber annular inflatable tire being sealingly attached around the outer periphery of said metal wheel; and, said metal wheel further having a valve stem opening in said outer peripheral metal portion;
   a hollow stem of a type for receiving a one-way check valve, said hollow stem extending through said valve stem opening in the outer peripheral metal portion;
   an extension tube sealingly attached at one end thereof to one end of said hollow stem on one side of said central metal portion and extending through a selected one of said plurality of lug bolt holes in the said central metal portion to the other side of said central metal portion;
   a rubber washer disposed in the selected one of said plurality of lug holes, said extension tube extending through said rubber washer;
   a one-way valve means disposed in the other end of said extension tube for permitting the inflation of said rubber tire through said extension tube; and
   a pressure gauge means operably connected to said extension tube adjacent the other end thereof for constantly showing the air pressure inside of said tire.

2. The apparatus of claim 1 including means attached to the inside of the trunk of a vehicle, extending through said open hub and being in engagement with said central metal portion, for holding said wheel and tire from shifting around in the trunk of such vehicle.

3. The apparatus of claim 2 wherein said valve stem is under said central metal portion of the wheel and said other end of the extension tube and the pressure gauge is above said central metal portion of said metal wheel.

* * * * *